United States Patent
Hong

(10) Patent No.: US 12,476,685 B2
(45) Date of Patent: Nov. 18, 2025

(54) INFORMATION TRANSMISSION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 413 days.

(21) Appl. No.: 18/001,856

(22) PCT Filed: Jun. 18, 2020

(86) PCT No.: PCT/CN2020/096873
§ 371 (c)(1),
(2) Date: Dec. 14, 2022

(87) PCT Pub. No.: WO2021/253342
PCT Pub. Date: Dec. 23, 2021

(65) Prior Publication Data
US 2023/0261721 A1    Aug. 17, 2023

(51) Int. Cl.
*H04B 7/06* (2006.01)
*H04W 72/0453* (2023.01)

(52) U.S. Cl.
CPC .... *H04B 7/06952* (2023.05); *H04W 72/0453* (2013.01)

(58) Field of Classification Search
CPC ............... H04B 7/06952; H04B 7/088; H04W 72/0453; H04W 74/0808; H04W 72/046; H04W 74/002; H04W 72/12; H04W 16/14
See application file for complete search history.

(56) References Cited

U.S. PATENT DOCUMENTS

| | | | |
|---|---|---|---|
| 2012/0207036 A1* | 8/2012 | Ong | H04W 72/04 370/252 |
| 2018/0115996 A1 | 4/2018 | Si et al. | |
| 2018/0199369 A1* | 7/2018 | Larsson | H04W 72/23 |
| 2019/0141693 A1 | 5/2019 | Guo et al. | |
| 2019/0182685 A1 | 6/2019 | Abouelseoud et al. | |
| 2019/0357255 A1* | 11/2019 | Sun | H04L 5/0062 |
| 2020/0252806 A1* | 8/2020 | Yerramalli | H04L 27/0006 |

FOREIGN PATENT DOCUMENTS

| | | | |
|---|---|---|---|
| CN | 107835516 A | 3/2018 | |
| CN | 110351059 A | 10/2019 | |
| CN | 110475265 A | 11/2019 | |
| CN | 111052631 A | 4/2020 | |
| WO | WO-2019079500 A1 * | 4/2019 | H04B 7/0695 |
| WO | 2019160973 A1 | 8/2019 | |

OTHER PUBLICATIONS

"Channel Access Mechanism in support," Proceedings of the 3GPP TSG RAN WG1 #101, CATT, R1-2003637, May 25, 2020, e-Meeting, 4 pages.

* cited by examiner

*Primary Examiner* — Thai Nguyen
(74) *Attorney, Agent, or Firm* — McCoy Russell LLP

(57) ABSTRACT

An information transmission method, includes: a first network node performing beam scanning on a target spectrum; and feeding back occupancy information of the target spectrum determined based on the beam scanning to a second network node, where the occupancy information is used for the second network node to determine resource scheduling on the target spectrum.

16 Claims, 11 Drawing Sheets ation No. PCT/CN2020/096873 entitled
INFORMATION TRANSMISSION METHOD AND APPARATUS, COMMUNICATION DEVICE, AND STORAGE MEDIUM

CROSS REFERENCE TO RELATED APPLICATION

The present application is a U.S. National Phase of International Application No. PCT/CN2020/096873 entitled "INFORMATION TRANSMISSION METHOD, DEVICE, COMMUNICATION DEVICE, AND STORAGE MEDIUM," and filed on Jun. 18, 2020. The entire contents of the above-listed application are hereby incorporated by reference for all purposes.

BACKGROUND

Dynamic spectrum sharing is widely applied to a radio communication system. In a cellular mobile network, to use an unlicensed spectrum of a 5 GHz frequency band, before each use of the unlicensed spectrum, a transmitting end may first perform a listen before talk (LBT) test to determine whether a channel is occupied by other nodes.

With development of mobile communication technologies, to meet demands of higher rates, high-frequency large-scale antenna technologies are becoming a trend of radio communication development. For example, in 5G NR communication, a millimeter wave has been introduced, and it can be foreseen that in the next generation of mobile communication, a Tera Hertz (THz) frequency band will be widely applied.

SUMMARY

The present application relates to the technical field of radio communications, but is not limited to the technical field of radio communications, and in particular, to an information transmission method and apparatus, a communication device, and a storage medium.

The embodiments of the present disclosure provide an information transmission method and apparatus, a communication device, and a storage medium.

According to a first aspect of an embodiment of the present disclosure, there is provided an information transmission method, applied to a first network node, the method including:

performing beam scanning on a target spectrum; and feeding back occupancy information of the target spectrum determined based on the beam scanning to a second network node, where the occupancy information is used for the second network node to determine resource scheduling on the target spectrum.

According to a second aspect of an embodiment of the present disclosure, there is provided an information transmission method, applied to a second network node, the method including:

receiving occupancy information of a target spectrum sent by a first network node, where the occupancy information is determined by means of beam scanning of the first network node on the target spectrum; and performing resource scheduling on the target spectrum based on the occupancy information.

According to a third aspect of the embodiments of the present disclosure, there is provided a communication device, including a processor, a transceiver, a memory, and executable programs stored in the memory and may be executed by the processor, where when executing the executable programs, the processor performs the steps of the information transmission method according to the first aspect or the second aspect.

According to a fourth aspect of the embodiments of the present disclosure, there is provided a storage medium storing executable programs, where when the executable programs are executed by a processor, the steps of the information transmission method according to the first aspect or the second aspect are implemented.

It should be understood that the above general description and the following detailed description are only exemplary and explanatory, and cannot limit the embodiments of the present disclosure.

BRIEF DESCRIPTION OF THE DRAWINGS

The accompanying drawings are incorporated into the specification and constitute a part of the specification, show embodiments consistent with the present invention, and are used to explain the principle of the embodiments of the present invention together with the specification.

DETAILED DESCRIPTION

Exemplary embodiments will be described in detail here, and examples thereof are shown in the accompanying drawings. When the following descriptions refer to the figures, the same numbers in different figures indicate the same or similar elements, unless otherwise indicated. The implementations described in the following examples do not represent all implementations consistent with the embodiments of the present invention. Instead, they are merely examples of apparatuses and methods consistent with some aspects of the embodiment of the present invention as detailed in the appended claims.

The terms used in the embodiments of the present disclosure are only for the purpose of describing specific embodiments, and are not intended to limit the embodiments of the present disclosure. The terms "a/an", "said", and "the" in the singular form used in the embodiments of the present disclosure and the appended claims are also intended to include the plural form, unless otherwise clearly indicated in the context. It should be further understood that the term "and/or" used in the present disclosure refers to and includes any or all possible combinations of one or more of the associated listed items.

It should be understood that although the terms 'first', "second", "third", etc. may be used in the embodiments of the present disclosure to describe various information, the information should not be limited to these terms. These terms are merely used to distinguish the same type of information from one another. For example, without departing from the scope of the embodiments of the present disclosure, the first information may also be referred to as second information, and similarly, the second information may also be referred to as first information. Depending on the context, the word "if" as used here may be interpreted as "when" or "upon" or "in response to determining".

Figure 1:
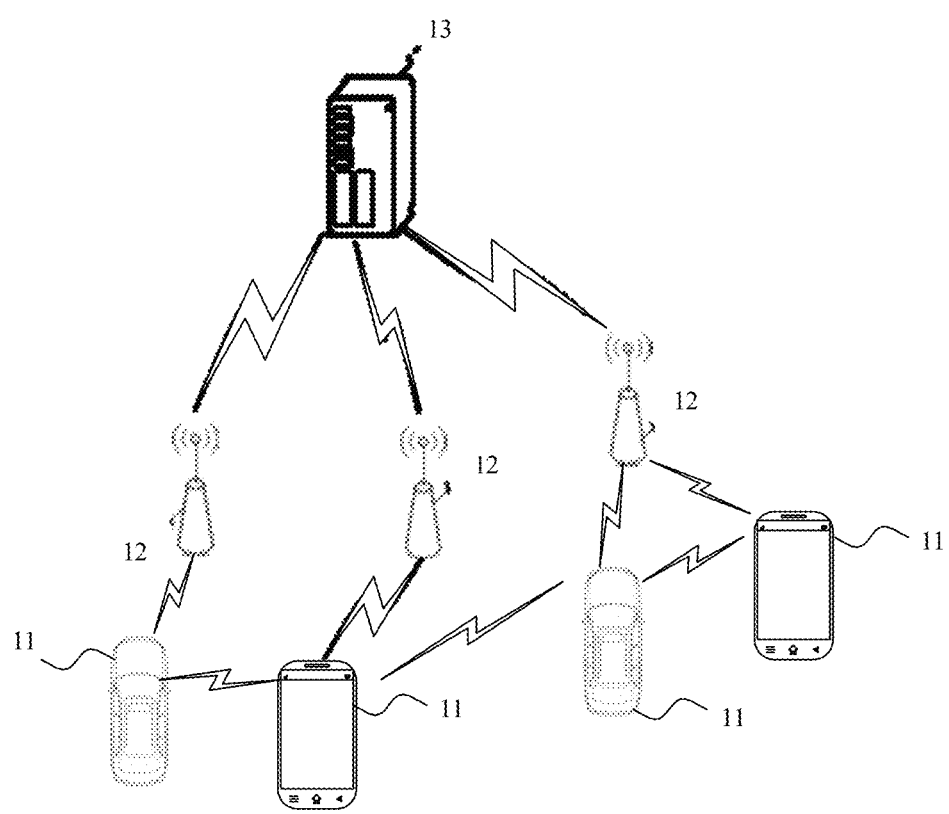
FIG. 1 is a schematic structural diagram of a communication system according to an example.

Referring to FIG. 1, which shows a schematic structural diagram of a radio communication system according to an embodiment of the present disclosure. As shown in FIG. 1, the radio communication system is a communication system based on a cellular mobile communication technology and may include: a plurality of terminals 11 and a plurality of base stations 12.

The terminal 11 may refer to a device for providing voice and/or data connectivity for a user. The terminal 11 may be in communication with one or more core networks via a radio access network (RAN), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus. For example, a station (STA), a subscriber unit, a subscriber station, a mobile station, a mobile, a remote station, an access point, a remote terminal, an access terminal, a user apparatus, a user agent, user equipment (UE), or a user terminal. Or the terminal 11 may also be an unmanned aerial vehicle device. Or the terminal 11 may also be a vehicle-mounted device, for example, may be a trip computer having a radio communication function, or may be a radio communication device connected to the trip computer externally. Or the terminal 11 may also be a roadside device, for example, may be a street lamp having the radio communication function, a signal light, or other roadside devices.

The base station 12 may be a network side device in the radio communication system. The radio communication system may be the 4th generation mobile communication technology (4G) system, also referred to as a long term evolution (LTE) system; or, the radio communication system may also be a 5G system, also referred to as a new radio (NR) system or a 5G NR system. Or the radio communication system may also be a next generation system of the 5G system. An access network in the 5G system may be referred to as a new generation-radio access network (NG-RAN). Or an MTC system.

The base station 12 may be an evolved base station (eNB) used in the 4G system. Or the base station 12 may also be a base station using a centralized distribution architecture (gNB) in the 5G system. When the base station 12 uses the concentrated distribution architecture, a central unit (CU) and at least two distributed units (DU) are included usually. The central unit is provided with protocol stacks of a packet data convergence protocol (PDCP) stratum, a radio link control (RLC) protocol stratum, and a media access control (MAC) stratum; and the distributed unit is provided with a protocol stack of a physical (PHY) stratum, and the embodiments of the present disclosure do not limit the specific implementations of the base station 12.

Radio connection between the base station 12 and the terminal 11 may be established by means of a radio air interface. In different implementations, the radio air interface is a radio air interface based on the 4th generation mobile communication network technology (4G) standard, or the radio air interface is a radio air interface based on the 5th generation mobile communication network technology (5G) standard, for example, the radio air interface is a new radio; or the radio air interface may also be a radio air interface based on a further next generation mobile communication network technology standard of 5G.

In some embodiments, end to end (E2E) connection may further be established between the terminals 11. For example, scenarios such as vehicle to vehicle (V2V) communication, vehicle to infrastructure (V2I) communication, and vehicle to pedestrian (V2P) communication in vehicle to everything (V2X) communication.

In some embodiments, the above radio communication system further includes a network management device 13.

A plurality of base station 12 are connected with the network management device 13 respectively, where the network management device 13 may be a core network device of the radio communication system, for example, the network management device 13 may be a mobility management entity (MME) in an evolved packet core network (EPC), Or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 13.

An execution body related to the embodiments of the present disclosure includes but is not limited to: a terminal using a cellular mobile communication technology for communication, and a base station, etc.

Figure 2:
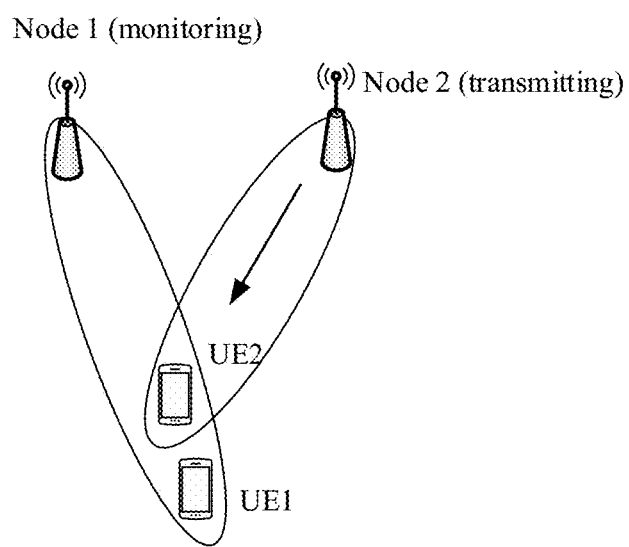
FIG. 2 is a schematic diagram of signal interference according to an example.

An application scenario of the embodiments of the present disclosure is: generally using a beam with a relatively narrow coverage area as a carrier wave for a high frequency band spectrum such as a millimeter wave. The following problems may exist when LBT monitoring is performed in a transmitting end:

1. As shown in FIG. 2: although a node 1 which is monitoring tests the LBT successfully, UE 1 cannot normally receive the node 1 due to interference of a node 2.

Figure 3:
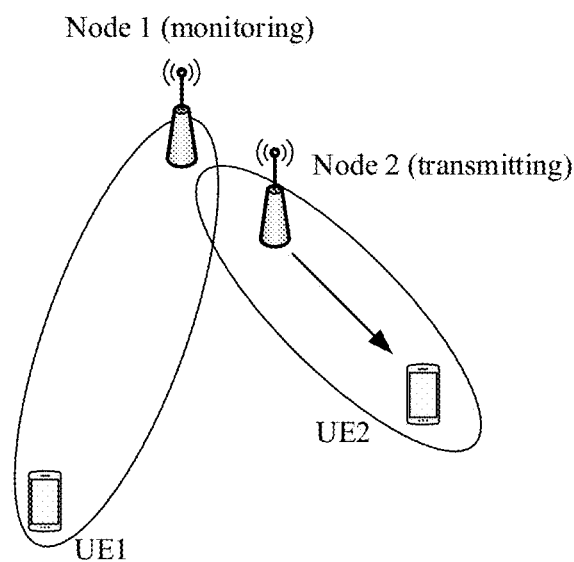
FIG. 3 is a schematic diagram of another signal interference according to an example.

2. As shown in FIG. 3: although a monitoring node 1 fails to test the LBT, UE 1 can normally receive transmission of the node 1.

Figure 4:
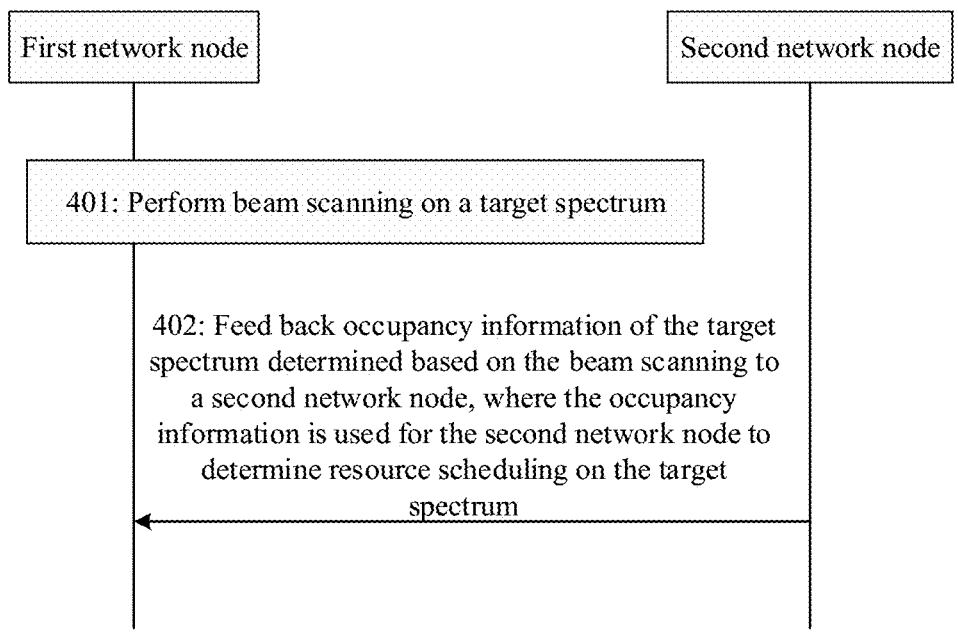
FIG. 4 is a schematic flowchart of an information transmission method according to an example.

As shown in FIG. 4, an example provides an information transmission method which may be applied to a first network node of radio communication, the information transmission method may include:

step 401: performing beam scanning on a target spectrum; and step 402: feeding back occupancy information of the target spectrum determined based on the beam scanning to a second network node, where the occupancy information is used for the second network node to determine resource scheduling on the target spectrum.

The first network node may include but is not limited to user equipment or a base station in a mobile communication system, and the second network node may include but is not limited to the user equipment or the base station in the mobile communication system. Communication between the first network node and the second network node may be communication between the user equipment and the base station, and may also be direct communication between user equipment, for example, the first network node and the second network node respectively are two user equipment using a sidelink for communication, or the first network node is the user equipment such as a terminal in cellular mobile communication, and the second network node is the base station in the cellular mobile communication.

The target spectrum may be a spectrum of a high-frequency frequency band in a frequency range of 24 GHz to 100 GHz, and when the first network node and the second network node use the target spectrum for communication, usually, a beam obtained by means of beamforming and other manners is taken as a carrier wave. The beam obtained by means of beamforming and other manners usually is a narrow beam, that is, the beam has relatively narrow coverage area and relatively strong directivity. When the target spectrum is used for communication, the first network node needs to perform LBT monitoring on the target spectrum to determine an occupancy condition of the target spectrum, and when the target spectrum is not occupied, the target spectrum may be used for communication. Here, whether the target spectrum is occupied may be judged based on energy of an interference signal monitored by the LBT. When the energy of the interference signal is greater than an energy threshold, it is determined that the target spectrum is occupied. Here, the interference signal may be radio signals of different systems, or radio signals of other links in this system.

The first network node and the second network node may further establish a communication link by using other spectrum resources different from the target spectrum. Frequencies of other spectrum resources may be lower than that of the target spectrum. When transmission rates provided by other spectrum resources cannot meet needs of current data transmission, and/or, signal quality of other spectrum resources cannot meet needs of current data transmission, the first network node may try to perform data transmission by using the target spectrum. Before trying to perform the data transmission by using the target spectrum, the occupancy condition of the target spectrum may be first monitored.

For example, in 5G cellular mobile communication, two communication frequency bands are mainly used, and a 6 GHz sub-band (Sub-6 GHz) is a low-frequency frequency band, and a millimeter wave in 24 GHz to 100 GHz is a high-frequency frequency band. When the millimeter wave in 24 GHz to 100 GHz is used for communication, this is implemented by means of the narrow beam usually. The user equipment may work at the low-frequency frequency band, and when a data transmission rate, signal quality, or the like of the low-frequency frequency band cannot meet the needs, the user equipment may try to use the high-frequency frequency band for communication. Before trying to perform the data transmission by using the high-frequency frequency band, the occupancy condition of the high-frequency frequency band may be first monitored.

Here, the beam may be a scanning beam obtained by the means of beamforming and other manners. A signal coverage area of each beam is different. The first network node may respectively monitor the energy of the target spectrum on each beam, so as to determine an energy condition of the target spectrum. When the energy of the target spectrum monitored on one scanning beam is greater than the energy threshold, it may be determined that the target spectrum monitored by the scanning beam is occupied, that is, the target spectrum in the signal coverage area of the beam is occupied. Because regions covered by each beam may be different when beam scanning is used, the occupancy condition of the target spectrum with different coverage regions may be scanned by means of the beam scanning.

Occupancy information of the target spectrum may include: information of the occupancy condition of the target spectrum monitored by each scanning beam, information indicating a scanning beam monitoring that the target spectrum is not occupied, and the like. The occupancy information of the target spectrum may further include: the number of scanning beams monitoring that the target spectrum is occupied, the number of scanning beams monitoring that the target spectrum is not occupied, a beam identifier, and the like; and in this way, the occupancy condition of the target spectrum may be determined, and the scanning beams with unoccupied target spectrum may be determined.

For example, the occupancy information of the target spectrum may include the energy of the target spectrum respectively monitored by each scanning beam. When the energy of the target spectrum monitored by one scanning beam is greater than the energy threshold, it may be determined that the target spectrum in the coverage area of the scanning beam is occupied.

For example, the first network node may be the user equipment in the 5G cellular mobile communication, and the second network node may be the base station. The user equipment currently works at the low-frequency frequency band, and when the data transmission rate, signal quality, or the like of the low-frequency frequency band cannot meet the needs, the user equipment may monitor the occupancy condition of the high-frequency frequency band. The user equipment may obtain a monitoring result of each scanning beam by using a plurality of scanning beams to cover different regions and determine the occupancy condition of the high-frequency frequency band.

The first network node may send the occupancy information of the target spectrum to the second network node by using communication links established by other spectrums different from the target spectrum. The occupancy information of the target spectrum may be used for the second node to determine whether data communication is performed on the target spectrum.

For example, the first network node may be the user equipment in the 5G cellular mobile communication, and the second network node may be the base station. The user equipment currently works at the low-frequency frequency band, and when the data transmission rate, signal quality, or the like of the low-frequency frequency band cannot meet the needs, the user equipment monitors the occupancy condition of the high-frequency frequency band by using a plurality of beams. The user equipment may send the occupancy information of the high-frequency frequency band to the base station by using the communication links established at the low-frequency frequency band.

In this way, a plurality of scanning beams are used to monitor different beam coverage regions, such that an occupancy condition of a target spectrum in the different beam coverage regions may be provided more accurately, and erroneous judgment on the occupancy condition of the target spectrum due to monitoring without distinguishing regions is reduced, so as to reduce a problem of resource waste or radio signal interference due to the erroneous judgment on the occupancy condition of the target spectrum, and improve utilization efficiency of the target spectrum.

In an embodiment, the occupancy information includes: information of an occupancy state of the target spectrum scanned by each beam, and/or, the number of beams scanning that the target spectrum is occupied.

The occupancy information may include a monitoring result of each beam, that is, the information of the occupancy state of the target spectrum scanned by each beam. The first network node may report the information of the occupancy state of the target spectrum tested by each beam. Here, the information of the occupancy state of the target spectrum scanned by each beam may be an occupied or unoccupied condition of the target spectrum monitored by a single beam.

The first network node may also report a beam identifier of each beam simultaneously, and the second network node may determine, based on the beam identifier, a region covered by a beam with an occupied or unoccupied target spectrum.

The first network node may further report the number of the scanning beams monitoring that the target spectrum is occupied. The second network node may determine the occupancy condition of the target spectrum based on the number of beams monitoring that the target spectrum is occupied, and may determine an occupied proportion condition of the target spectrum in combination with the total number of beams. The second network node may evaluate, based on the occupied condition of the target spectrum or the occupied proportion condition, whether the communication link can be established on the target spectrum for communication with the first network node.

For example, the second network node may schedule a transmission resource of the communication link between the first network node and the second network node based on the occupancy condition of the target spectrum scanned by each beam. For example, one or more unoccupied beams on the target spectrum may be scheduled for the communication link between the first network node and the second network node. Even if only one beam in the plurality of beams scans that the target spectrum is unoccupied, the beam may still be used for the communication link between the first network node and the second network node. In this way, utilization efficiency of the target spectrum may be improved. When the target spectrum scanned by each beam is occupied, spectrum resources in addition to the target spectrum may be scheduled.

In an embodiment, the feeding back occupancy information of the target spectrum determined based on the beam scanning to a second network node includes:
feeding back the occupancy information to the second network node in response to at least one beam scanning to determine that the target spectrum is occupied.

Here, the first network node may report the occupancy information of the target spectrum in a triggering report manner. When any one of beams monitors that the target spectrum in the target communication region is occupied, the first network node may be triggered to send the occupancy information of the target spectrum.

In an embodiment, the performing beam scanning on a target spectrum includes at least one of the following:
performing the beam scanning on the target spectrum in response to the first network node having data sent to the second network node;
performing the beam scanning on the target spectrum in response to receiving a data transmission request of the second network node; and
performing the beam scanning on the target spectrum according to a scanning cycle.

The first network node may be triggered by means of a preset condition to monitor the target spectrum. The preset condition may be that: a data transmission need is between the first network node and the second network node, for example, but is not limited to: the first network node has data sending to the second network node and/or, the second network node has data sending to the first network node.

The first network node may periodically monitor the target spectrum.

In an embodiment, the performing beam scanning on a target spectrum includes:
performing the beam scanning on a target communication region between the first network node and the second network node on the target spectrum; and
the feeding back occupancy information of the target spectrum determined based on the beam scanning to a second network node includes:
feeding back the occupancy information of the target spectrum in the target communication region to the second network node, where
the occupancy information is used for the second network node to determine resource scheduling on the target spectrum in the target communication region.

The target communication region may be a communication space between the first network node and the second network node, and a radio signal in communication between the first network node and the second network node is propagated in the target communication region. The first network node may evaluate a possible target communication region based on a corresponding position of the first network node and the second network node, and may monitor the target spectrum of the target communication region. The first network node may also determine all regions around the first network node as target communication regions.

A plurality of beams may be used to cover the target communication region, that is, each beam covers one sub-region of the target communication region, and a plurality of sub-regions are integrated into the target communication region. The first network node may respective monitor the target spectrum based on a coverage area of each beam, that is, respectively monitor the target spectrum on each beam.

In this way, the occupancy condition of the target spectrum of each sub-region of the target communication region may be determined, to provide a more accurate occupancy condition of the target spectrum in the target communication region. A misjudgment on the occupancy condition of the target spectrum is reduced, and a success rate of communication of the first network node and the second network node using the target spectrum is increased, such that utilization efficiency of the target spectrum is improved.

In an embodiment, the method further includes at least one of the following:
determining the target communication region between the first network node and the second network node based on an angle of arrival of a reference signal transmitted by the second network node;
determining the target communication region between the first network node and the second network node based on a historical communication beam of the first network node and the second network node; and
determining the target communication region between the first network node and the second network node based on a beam of an existing communication link between the first network node and the second network node.

Figure 5:
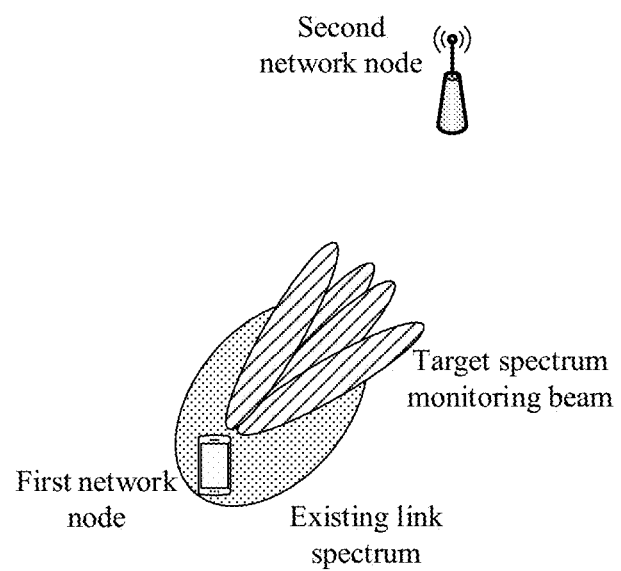
FIG. 5 is a schematic determination chart of a target communication region according to an example.

As shown in FIG. 5, a first network node may determine a target communication region based on existing communication link. For example, the first network node, by receiving a reference signal of a second network node on the existing link, estimates a general direction of the second network node based on an angle of arrival of the reference signal. The first network node takes a scanning beam to be oriented towards the target communication region on a target spectrum, and because the scanning beam on the target spectrum is relatively narrow, a plurality of scanning beams may be used to cover the target communication region. The target communication region may be a region determined by means of angle deflection and other manners based on the angle of arrival of the reference signal.

Figure 6:
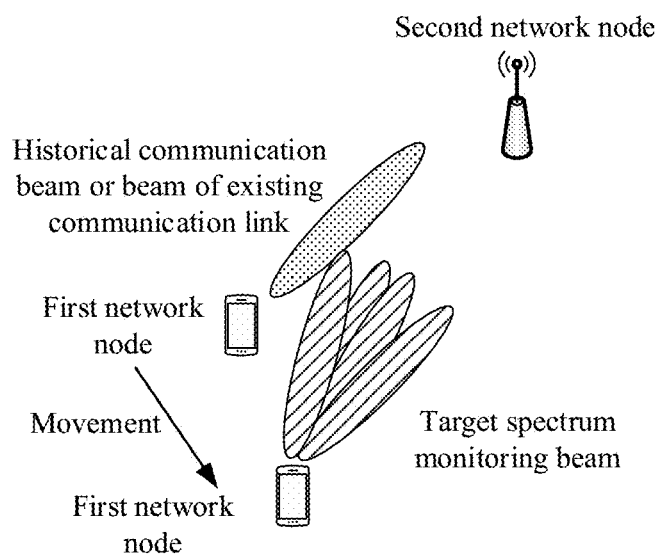
FIG. 6 is a schematic determination chart of another target communication region according to an example.

As shown in FIG. 6, a first network node may further determine a target communication region based on a historical communication beam of a second network node or a beam of an existing communication link. Here, the historical communication beam may be a beam of a currently disconnected link due to movement of the first network node. An angle of second network node with respect to the first network node may be determined based on the historical communication beam or the beam of the existing communication link, so as to determine the target communication region, where the historical communication beam may be the beam of the target spectrum.

For example, the first network node and the second network node establish a communication link currently, communication quality of using the beam of the existing communication link is reduced with the movement of the first network node, the first network node needs to monitor the target communication region again at a new position, and the first network node may determine the target communication region based on a beam direction of the beam of the existing communication link. For example, the first network node may determine the target communication region by comparing a posture of the first network node with position movement information and based on the beam direction of the beam of the existing communication link. The target communication region may be a region determined by means of angle deflection and other manners and based on the beam of the existing communication link or the historical communication beam.

In some embodiments, the method further includes:

receiving resource indication information sent by the second network node, where the resource indication information is used to indicate a resource on the target spectrum scheduled by the second network node.

After the second network node receives occupancy information of the target spectrum in the target communication region, it may be determined that whether the target communication region may use the target spectrum for communication.

For example, the second network node may determine, based on the occupancy condition of the target spectrum monitored by each beam, that whether the target spectrum may be used for communication. For example, when a monitoring result is that a proportion of the number of beams in which the target spectrum is occupied to the number of all beams is greater than a proportion threshold, it may be determined that the target spectrum in the target communication region is occupied and cannot be used; and when the proportion is less than or equal to the proportion threshold, it may be determined that the target spectrum in the target communication region may be used.

When determining that the target communication region may use the target spectrum for communication, the second network node may indicate a transmission resource to the first network node. The first network node may in data communication with the second network node on the target spectrum by using the indicated transmission resource.

For example, the first network node may be the user equipment in the 5G cellular mobile communication, and the second network node may be the base station. The user equipment sends the occupancy information of the target spectrum in the target communication region to the base station, and the base station determines, based on the occupancy information, whether the target spectrum may be used for communication. When the base station may use the target spectrum for communication, the transmission resource may be indicated to the use equipment.

In an embodiment, the method further includes: sending indication information indicating a channel number to which the target spectrum belongs to the second network node.

Here, the target spectrum may be a spectrum of one channel, or spectrums of a plurality of channels, and the first network node may send the channel number to which the target spectrum belongs to the second network node. The second network node may determine an occupancy condition of a spectrum of a channel corresponding to the channel number.

Figure 7:
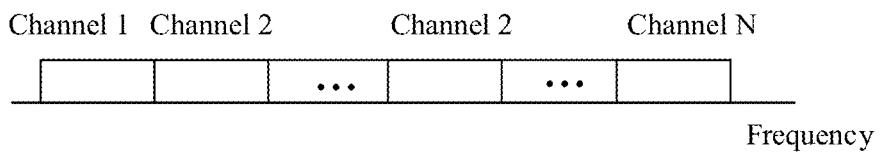
FIG. 7 is a schematic diagram of channel division according to an example.

Here, as shown in FIG. 7, the channel number may be an identifier decided by the first network node and the second network node for one frequency band.

Figure 8:
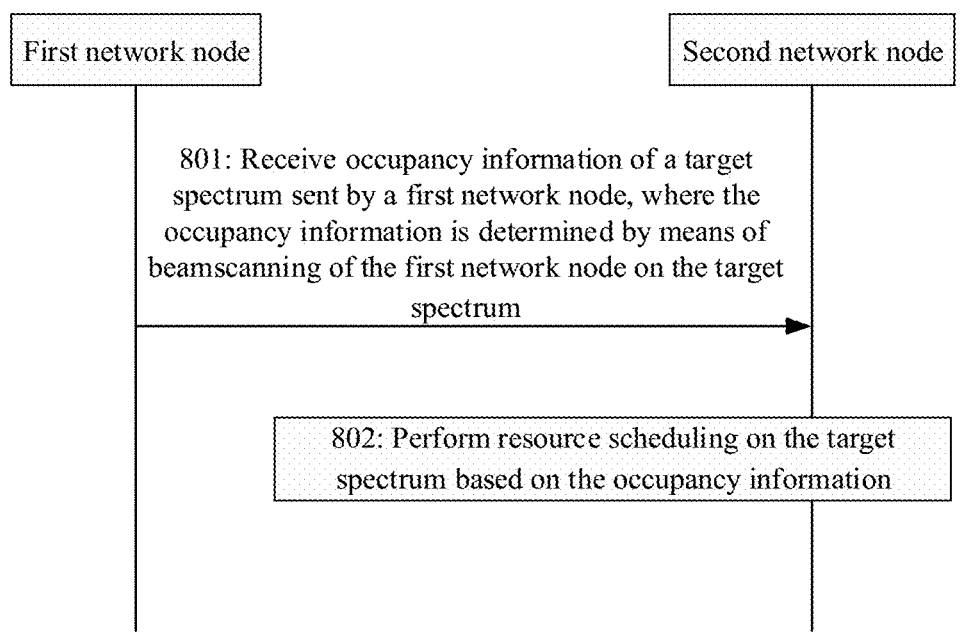
FIG. 8 a schematic diagram of another downlink information transmission according to an example.

As shown in FIG. 8, an example provides an information transmission method which may be applied to a second network node of radio communication, the information transmission method may include:

step 801: receiving occupancy information of a target spectrum sent by a first network node, where the occupancy information is determined by means of beam scanning of the first network node on the target spectrum; and step 802: performing resource scheduling on the target spectrum based on the occupancy information.

The first network node and the second network node may further establish a communication link by using other spectrum resources different from the target spectrum. The first network node may send the occupancy information of the target spectrum to the second network node by means of a communication link established by other spectrum resources.

Occupancy information of the target spectrum may include: information of the occupancy condition of the target spectrum monitored by each scanning beam, information indicating a scanning beam monitoring that the target spectrum is not occupied, and the like. The occupancy information of the target spectrum may further include: the number of scanning beams monitoring that the target spectrum is occupied, the number of scanning beams monitoring that the target spectrum is not occupied, a beam identifier, and the like; and in this way, the occupancy condition of the target spectrum may be determined, and the scanning beam with unoccupied target spectrum may be determined.

For example, the occupancy information of the target spectrum may include the energy of the target spectrum respectively monitored by each scanning beam. When the energy of the target spectrum monitored by one scanning beam is greater than the energy threshold, it may be determined that the target spectrum in the coverage area of the scanning beam is occupied.

For example, the first network node may be the user equipment in the 5G cellular mobile communication, and the second network node may be the base station. The user equipment currently works at the low-frequency frequency band, and when the data transmission rate, signal quality, or the like of the low-frequency frequency band cannot meet the needs, the user equipment may monitor the occupancy condition of the high-frequency frequency band. The user equipment may obtain a monitoring result of each scanning beam by using a plurality of scanning beams to cover different regions and determine the occupancy condition of the high-frequency frequency band.

The second network node may schedule a transmission resource of the communication link between the first network node and the second network node based on the occupancy condition of the target spectrum scanned by each beam. For example, one or more unoccupied beams on the target spectrum may be scheduled for the communication link between the first network node and the second network node. Even if only one beam in the plurality of beams scans that the target spectrum is unoccupied, the beam may still be used for the communication link between the first network node and the second network node. In this way, in an aspect, success rate of establishing the communication link between the first network node and the second network node may be improved, and in another aspect, utilization efficiency of the target spectrum may further be improved. When the target spectrum scanned by each beam is occupied, spectrum resources in addition to the target spectrum may be scheduled.

In this way, a plurality of scanning beams are used to monitor different beam coverage regions, such that an occupancy condition of a target spectrum in the different beam coverage regions may be provided more accurately, and erroneous judgment on the occupancy condition of the target spectrum due to monitoring without distinguishing regions is reduced, so as to reduce a problem of resource waste or radio signal interference due to the erroneous judgment on the occupancy condition of the target spectrum, and improve utilization efficiency of the target spectrum.

In an embodiment, the occupancy information includes:

information of an occupancy state of the target spectrum scanned by each beam; and/or, the number of beams scanning that the target spectrum is occupied.

The occupancy information may include a monitoring result of each beam, that is, the information of the occupancy state of the target spectrum scanned by each beam. The first network node may report the information of the occupancy state of the target spectrum tested by each beam. Here, the information of the occupancy state of the target spectrum scanned by each beam may be an occupied or unoccupied condition of the target spectrum monitored by a single beam.

The first network node may also report a beam identifier of each beam simultaneously, and the second network node may determine, based on the beam identifier, a region covered by a beam with an occupied or unoccupied target spectrum.

The first network node may further report the number of the scanning beams monitoring that the target spectrum is occupied. The second network node may determine the occupancy condition of the target spectrum based on the number of beams monitoring that the target spectrum is occupied, and may determine an occupied proportion condition of the target spectrum in combination with the total number of beams. The second network node may evaluate, based on the occupied condition of the target spectrum or the occupied proportion condition, whether the communication link can be established on the target spectrum for communication with the first network node.

In an embodiment, the occupancy information is determined by the first network node performing the beam scanning on a target communication region between the first network node and the second network node on the target spectrum; and the performing resource scheduling on the target spectrum based on the occupancy information includes:

performing the resource scheduling on the target spectrum in the target communication region based on the occupancy information.

The target communication region may be a communication space between the first network node and the second network node, and a radio signal in communication between the first network node and the second network node is propagated in the target communication region. The first network node may evaluate a possible target communication region based on a corresponding position of the first network node and the second network node, and may monitor the target spectrum of the target communication region. The first network node may also determine all regions around the first network node as target communication regions.

A plurality of beams may used to cover the target communication region, that is, each beam covers one sub-region of the target communication region, and a plurality of sub-regions are integrated into the target communication region. The first network node may respective monitor the target spectrum based on a coverage area of each beam, that is, respectively monitor the target spectrum on each beam.

In this way, the occupancy condition of the target spectrum of each sub-region of the target communication region may be determined, to provide a more accurate occupancy condition of the target spectrum in the target communication region. A misjudgment on the occupancy condition of the target spectrum is reduced, and a success rate of communication of the first network node and the second network node using the target spectrum is increased, such that utilization efficiency of the target spectrum is improved.

In an embodiment, the method further includes:

sending resource indication information to the first network node, where the resource indication information is used to indicate a resource on the target spectrum scheduled by the second network node.

The first network node may send the occupancy information of the target spectrum to the second network node by using communication links established by other spectrums different from the target spectrum. The occupancy information of the target spectrum may be used for the second node to determine whether data communication is performed on the target spectrum.

For example, the first network node may be the user equipment in the 5G cellular mobile communication, and the second network node may be the base station. The user equipment currently works at the low-frequency frequency band, and when the data transmission rate, signal quality, or the like of the low-frequency frequency band cannot meet the needs, the user equipment may monitor the occupancy condition of the high-frequency frequency band by using a plurality of beams. The user equipment may send the occupancy information of the high-frequency frequency band to the base station by using the communication links established at the low-frequency frequency band.

After the second network node receives occupancy information of the target spectrum in the target communication region, it may be determined that whether the target communication region may use the target spectrum for communication.

For example, the second network node may determine, based on the occupancy condition of the target spectrum monitored by each beam, that whether the target spectrum may be used for communication. For example, when a monitoring result is that a proportion of the number of beams in which the target spectrum is occupied to the number of all beams is greater than a proportion threshold, it may be determined that the target spectrum in the target communication region is occupied and cannot be used; and when the proportion is less than or equal to the proportion threshold, it may be determined that the target spectrum in the target communication region may be used.

When determining that the target communication region may use the target spectrum for communication, the second network node may indicate a transmission resource to the first network node. The first network node may in data communication with the second network node on the target spectrum by using the indicated transmission resource.

For example, the first network node may be the user equipment in the 5G cellular mobile communication, and the second network node may be the base station. The user equipment sends the occupancy information of the target spectrum in the target communication region to the base station, and the base station determines, based on the occupancy information, whether the target spectrum may be used for communication. When the base station may use the target spectrum for communication, the transmission resource may be indicated to the use equipment.

In an embodiment, the method further includes: receiving the indication information sent by the first network node; and determining, based on the indication information, a channel number to which the target spectrum belongs.

Here, the target spectrum may be a spectrum of one channel, or spectrums of a plurality of channels, and the first network node may send the channel number to which the target spectrum belongs to the second network node. The second network node may determine an occupancy condition of a spectrum of a channel corresponding to the channel number.

Here, as shown in FIG. 7, the channel number may be an identifier decided by the first network node and the second network node for one frequency band.

Specific steps of the information transmission method provided by the specific example are as follows:

A terminal performs beam scanning and energy tests on a certain specific region on some spectrums in a periodical or triggering manner, and feeds back a scanned result to the base station by means of other established links. The base station decides, based on a result of feedback, that whether to agree to schedule resources on these specific spectrums.

The triggering manner refers to that the base station requests the terminal by means of the existing link, or the terminal is based on a need of a large amount of services to be transmitted.

The terminal may estimate a general direction of the base station based on a link of the existing link, for example, the terminal receives the reference signal of the base station on the existing link, to determine a specific region, or the terminal determines a specific region based on a previous beam direction; the terminal makes the beam be oriented towards the specific region on a new spectrum; and the terminal may have a relatively narrow beam on the new spectrum, and a plurality of beams may be needed to cover the region.

The scanned result may include: whether the spectrum is occupied, that is, the energy is greater than a certain preset value when testing, and if the plurality of beams all test that the energy is greater than the preset value, the scanned result may further include the number of beams with the energy greater than the preset value.

The scanned result may be reported in the triggering manner. For example: it is required to report when testing that the scanned result represents that the spectrum is occupied, or it is required to report when continuously testing that the scanned result represents that the spectrum is occupied for many times.

The base station decides, based on a result of feedback, that whether to agree to schedule resources on these specific spectrums. The base station decides, based on a service condition of the terminal and a resource usage condition of the base station, that a resource is scheduled on the new spectrum or a resource is not scheduled temporarily as a candidate resource.

Embodiment 1

It is applicable when a terminal performs random access on a new spectrum.

A terminal performs beam scanning and energy tests on a certain specific region on some spectrums in a periodical or triggering manner, and feeds back a scanned result to the base station by means of other established links. The base station decides, based on a result of feedback, that whether to agree to schedule resources on these specific spectrums.

The triggering manner refers to that the base station requests the terminal by means of the existing link, or the terminal is based on a need of a large amount of services to be transmitted.

As shown in FIG. 5, the terminal may estimate a general direction of the base station based on a link of an existing link, for example, the terminal receives a reference signal of the base station on the existing link; the terminal makes the beam be oriented towards the specific region on the new spectrum; and the terminal may have a relatively narrow beam on the new spectrum, and a plurality of beams may be needed to cover the region.

The scanned result may include: whether the spectrum is occupied, that is, the energy is greater than a certain preset value when testing, and if the plurality of beams all test that the energy is greater than the preset value, the scanned result may further include the number of beams with the energy greater than the preset value.

The scanned result may be reported in the triggering manner, that is, it is only required to report when testing that the scanned result represents that the spectrum is occupied, or it is required to report when continuously testing that the scanned result represents that the spectrum is occupied for many times.

Embodiment 2

It is applicable to a scenario that a terminal has accessed on a new spectrum, but the terminal cannot receive information of a base station due to suddenly poor channel on the new spectrum.

A terminal performs beam scanning and energy tests on a certain specific region on some spectrums in a periodical or triggering manner, and feeds back a scanned result to the base station by means of other established links. The base station decides, based on a result of feedback, that whether to agree to schedule resources on these specific spectrums.

The triggering manner refers to that the base station requests the terminal by means of the existing link, or the terminal is based on a need of a large amount of services to be transmitted.

As shown in FIG. 6, the terminal may determine the specific region based on a beam direction of the beam where the terminal is located before invalidation, for example, the terminal determines the specific region by comparing a posture of the terminal itself with position movement information and based on the beam direction before invalidation.

The terminal makes the beam be oriented towards the specific region on the new spectrum again; and the terminal may have a relatively narrow beam on the new spectrum, such that a plurality of beams may be needed to cover the region.

The scanned result may include: whether the spectrum is occupied, that is, the energy is greater than a certain preset value when testing, and if the plurality of beams all test that the energy is greater than the preset value, the scanned result may further include the number of beams with the energy greater than the preset value.

The scanned result may be reported in the triggering manner, that is, it is only required to report when testing that the scanned result represents that the spectrum is occupied. or it is required to report when continuously testing that the scanned result represents that the spectrum is occupied for many times.

Embodiment 3

In another embodiment, the scanned result may include: whether a spectrum is occupied, that is, energy is greater than a certain preset value when testing, and if a plurality of beams all test that the energy is greater than the preset value, the scanned result may further include the number of beams with the energy greater than the preset value. The scanned result may further include information of a channel number.

As shown in FIG. 7. A specific channel division method needs to be agreed by the terminal and the base station in advance.

Figure 9:
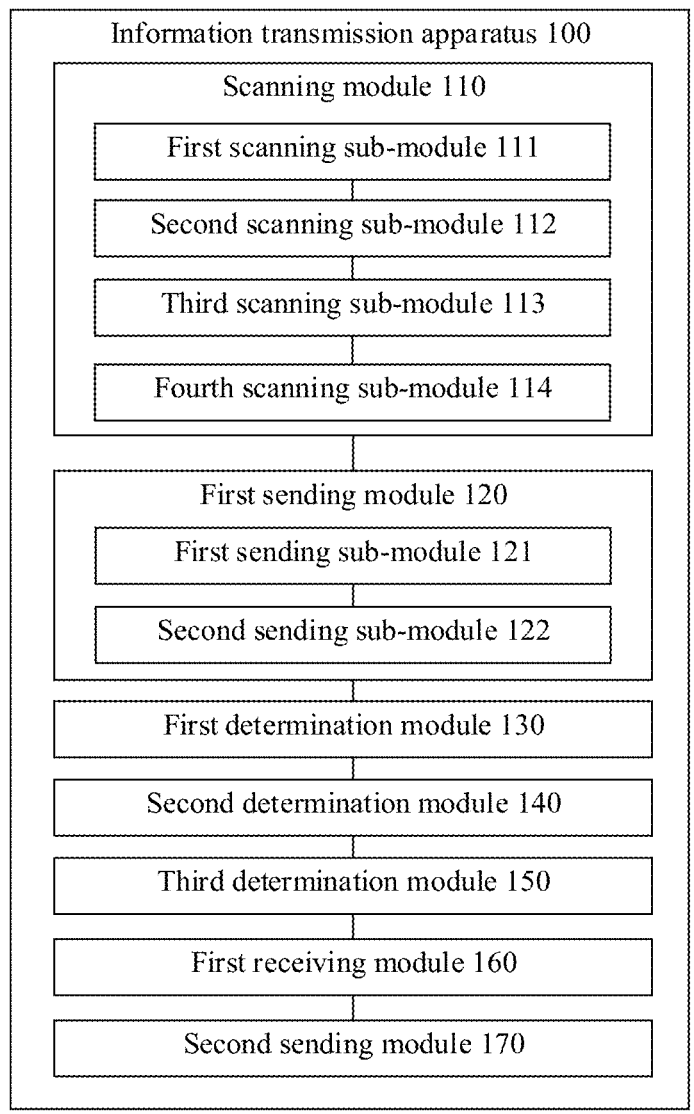
FIG. 9 is a structural block diagram of composition of an information transmission apparatus according to an example.

An embodiment of the present invention further provides an information transmission apparatus applied to a first network node of radio communication. FIG. 9 is a schematic structural diagram of composition of an information transmission apparatus 100 according to an embodiment of the present invention, and as shown in FIG. 9, the apparatus 100 includes: a scanning module 110 and a first sending module 120, where the scanning module 110 is configured to perform beam scanning on a target spectrum; and the first sending module 120 is configured to feed back occupancy information of the target spectrum determined based on the beam scanning to a second network node, where the occupancy information is used for the second network node to determine resource scheduling on the target spectrum.

In an embodiment, the occupancy information includes:
information of an occupancy state of the target spectrum scanned by each beam,
and/or
the number of beams scanning that the target spectrum is occupied.

In an embodiment, the first sending module 120 includes:
a first sending sub-module 121, configured to feed back the occupancy information to the second network node in response to at least one beam scanning to determine that the target spectrum is occupied.

In an embodiment, the scanning module 110 includes at least one of the following:
a first scanning sub-module 111, configured to perform the beam scanning on the target spectrum in response to the first network node having data sent to the second network node;
a second scanning sub-module 112, configured to perform the beam scanning on the target spectrum in response to receiving a data transmission request of the second network node; and a third scanning sub-module 113, configured to perform the beam scanning on the target spectrum according to a scanning cycle.

In an embodiment, the scanning module 110 includes:
a fourth scanning sub-module 114, configured to perform the beam scanning on a target communication region between the first network node and the second network node on the target spectrum; and
the first sending module 120 includes:
a second sending sub-module 122, configured to feed back the occupancy information of the target spectrum in the target communication region to the second network node, where
the occupancy information is used for the second network node to determine resource scheduling on the target spectrum in the target communication region.

In an embodiment, the apparatus 100 further includes at least one of the following:
a first determination module 130, configured to determine the target communication region between the first network node and the second network node based on an angle of arrival of a reference signal transmitted by the second network node;
a second determination module 140, configured to determine the target communication region between the first network node and the second network node based on a historical communication beam of the first network node and the second network node; and
a third determination module 150, configured to determine the target communication region between the first network node and the second network node based on a beam of an existing communication link between the first network node and the second network node.

In an embodiment, the apparatus 100 further includes:
a first receiving module 160, configured to receive resource indication information sent by the second network node, where the resource indication information is used to indicate a resource on the target spectrum scheduled by the second network node.

In an embodiment, the apparatus 100 further includes:
a second sending module 170, configured to send indication information indicating a channel number to which the target spectrum belongs to the second network node.

Figure 10:
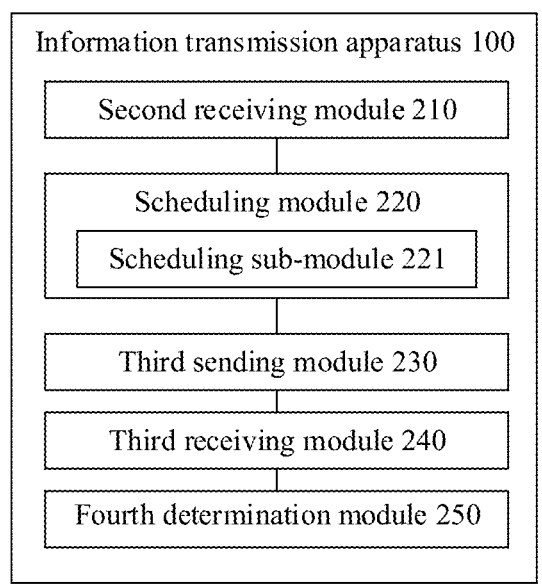
FIG. 10 is a structural block diagram of composition of another information transmission apparatus according to an example.

An embodiment of the present invention further provides an information transmission apparatus applied to a second network node of radio communication. FIG. 10 is a schematic structural diagram of composition of an information transmission apparatus 200 according to an embodiment of the present invention, and as shown in FIG. 10, the apparatus 200 includes: a second receiving module 210 and a scheduling module 220, where a second receiving module 210, configured to receive resource indication information sent by the second network node, where the occupancy information is determined by means of beam scanning of the first network node on the target spectrum.

the scheduling module 220 is configured to perform resource scheduling on the target spectrum based on the occupancy information.

In an embodiment, the occupancy information includes:
information of an occupancy state of the target spectrum scanned by each beam,
and/or
the number of beams scanning that the target spectrum is occupied.

In an embodiment, the occupancy information is determined by the first network node performing the beam scanning on a target communication region between the first network node and the second network node on the target spectrum; and the scheduling module 220 includes:

a scheduling sub-module 221, configured to perform the resource scheduling on the target spectrum in the target communication region based on the occupancy information.

In an embodiment, the apparatus 200 further includes:

a third sending module 230, configured to send resource indication information to the first network node, where the resource indication information is used to indicate a resource on the target spectrum scheduled by the second network node.

In an embodiment, the apparatus 200 further includes:

a third receiving module 240, configured to receive indication information sent by the first network node; and a fourth determination module 250, configured to determine, based on the indication information, a channel number to which the target spectrum belongs.

In an example, the scanning module 110, the first sending module 120, the first determination module 130, the second determination module 140, the third determination module 150, the first receiving module 160, the second sending module 170, the second receiving module 210, the scheduling module 220, the third sending module 230, the third receiving module 240, the fourth determination module 250, and the like may be implemented by one or more central processing units (CPUs), Graphics Processing Units (GPUs), baseband processors (BPs), application specific integrated circuits (ASICs), DSP, programmable logic devices (PLDs), complex programmable logic devices (CPLDs), field-programmable gate arrays (FPGAs), general-purpose processors, controllers, micro controller units (MCUs), microprocessors, or other electronic elements, to perform the foregoing method.

Figure 11:
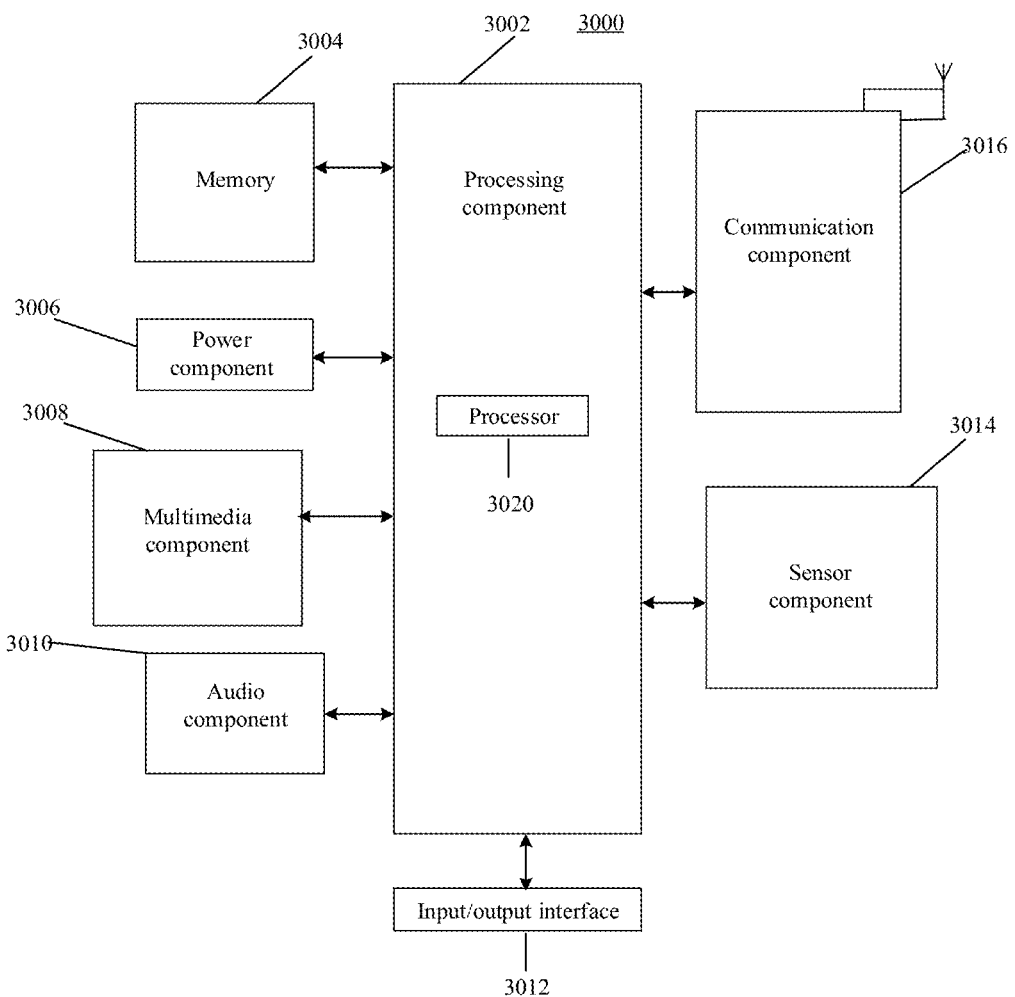
FIG. 11 is a block diagram of an apparatus for information transmission according to an example.

FIG. 11 is a block diagram of an information transmission apparatus 3000 according to an example. For example, the apparatus 3000 may be a mobile phone, a computer, a digital broadcasting terminal, a messaging device, a game console, a tablet device, a medical device, a fitness device, a personal digital assistant, etc.

Referring to FIG. 11, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 usually controls the overall operations of an apparatus 3000, such as operations associated with display, telephone call, information transmission, camera operation and recording operation. The processing component 3002 may include one or more processors 3020 to execute instructions to complete all of or part of the steps of the above method. In addition, the processing component 3002 may include one or more modules to facilitate the interaction between the processing component 3002 and other components. For example, the processing component 3002 may include a multimedia module to facilitate interaction between the multimedia component 3008 and the processing component 3002.

The memory 3004 is configured to store various types of data to support the operations at the device 3000. Examples of these data include instructions for any application or method operated on the apparatus 3000, contact data, phone book data, messages, pictures, videos, etc. The memory 3004 may be implemented by any type of volatile or non-volatile storage device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

The power component 3006 provides power for various components of the apparatus 3000. The power component 3006 may include a power management system, one or more power sources, and other components associated with power generation, management and distribution of the apparatus 3000.

The multimedia component 3008 includes a screen for providing an output interface between the device 3000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of a touch or slide, but also the duration and pressure associated with the touch or slide. In some examples, the multimedia component 3008 includes a front camera and/or a rear camera. When the device 3000 is in an operation mode, such as a shooting mode or a video mode, the front camera and/or the rear camera may receive external multimedia data. Each front or rear camera may be a fixed optical lens system or have a focal length and optical zoom capability.

The audio component 3010 is configured to output and/or input an audio signal. For example, the audio component 3010 includes a microphone (MIC), and when the apparatus 3000 is in an operation mode, such as a call mode, a recording mode, and a voice recognition mode, the microphone is configured to receive external audio signals. The received audio signals may be further stored in the memory 3004 or sent by the communication component 3016. In some embodiments, the audio component 3010 further includes a speaker for outputting audio signals.

The I/O interface 3012 provides an interface between the processing assembly 3002 and a peripheral interface module. The peripheral interface module may be a keyboard, a click wheel, buttons, etc. These buttons may include, but are not limited to a home button, a volume button, a start button, and a lock button.

The sensor component 3014 includes one or more sensors for providing various aspects of status assessment for the apparatus 3000. For example, the sensor component 3014 may detect an on/off state of the apparatus 3000, and relative positions of components such as a display and a keypad of the apparatus 3000. The sensor component 3014 may also detect a position change of the apparatus 3000 or one component of the apparatus 3000, presence or absence of contact between the user and the apparatus 3000, an orientation or acceleration/deceleration of the apparatus 3000 and a temperature change of the apparatus 3000. The sensor component 3014 may include a proximity sensor configured to detect the presence of nearby objects without any physical contact. The sensor component 3014 may further include an optical sensor, such as a CMOS or CCD image sensor, for use in imaging applications. In some embodiments, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and other devices. The device 3000 may access a wireless network based on communication standards, such as WiFi, 2G or 3G, or a combination thereof. In an exemplary example, the communication component 3016 receives broadcast signals or broadcast associated information from an external broadcast management system via a broadcast channel In an example, the communication component 3016 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 3004 including instructions executable by the processor 3020 of the apparatus 3000 to complete the above method. For example, the non-transitory computer-readable storage medium may be an ROM, a random access memory (RAM), a CD-ROM, a magnetic tape, a floppy disk, an optical data storage device, etc.

A person skilled in the art would readily conceive of other implementations of the embodiments of the present disclosure after considering the specification and practicing the invention disclosed herein. The present application is intended to cover any variations, uses or adaptive changes of the embodiments of the present disclosure. These variations, uses or adaptive changes follow the general principle of the embodiments of the present disclosure and include common general knowledge or conventional technical means in the technical field that are not disclosed in the embodiments of the present disclosure. The specification and the embodiments are merely regarded as exemplary, and the real scope and spirit of the embodiments of the present disclosure are pointed out by the following claims.

It should be understood that the embodiments of the present disclosure is not limited to the precise structure described above and shown in the figures, and various modifications and changes can be made without departing from its scope. The scope of the embodiments of the present disclosure is only limited by the appended claims.

The invention claimed is:

1. An information transmission method, performed by a first network node, the information transmission method comprising:
    performing beam scanning on a target spectrum; and
    feeding back occupancy information of the target spectrum determined based on the beam scanning to a second network node, where the occupancy information is used for the second network node to determine resource scheduling on the target spectrum;
    wherein the performing beam scanning on a target spectrum comprises:
    performing the beam scanning on a target communication region between the first network node and the second network node on the target spectrum; and
    the feeding back occupancy information of the target spectrum determined based on the beam scanning to a second network node comprises:
        feeding back occupancy information of the target spectrum in the target communication region to the second network node, wherein the occupancy information is used for the second network node to determine resource scheduling on the target spectrum in the target communication region;
    wherein the information transmission method further comprises at least one of the following:
    determining the target communication region between the first network node and the second network node based on an angle of arrival of a reference signal transmitted by the second network node;
    determining the target communication region between the first network node and the second network node based on a historical communication beam of the first network node and the second network node; and
    determining the target communication region between the first network node and the second network node based on a beam of an existing communication link between the first network node and the second network node.

2. The information transmission method according to claim 1, wherein the occupancy information comprises:
    information of an occupancy state of the target spectrum scanned by at least one beam;
    and/or,
    a number of beams scanning that the target spectrum is occupied.

3. The information transmission method according to claim 1, wherein the feeding back occupancy information of the target spectrum determined based on the beam scanning to a second network node comprises:
    feeding back the occupancy information to the second network node in response to at least one beam scanning to determine that the target spectrum is occupied.

4. The information transmission method according to claim 1, wherein the performing beam scanning on a target spectrum comprises at least one of the following:
    performing the beam scanning on the target spectrum in response to the first network node having data sent to the second network node;
    performing the beam scanning on the target spectrum in response to receiving a data transmission request of the second network node;
    performing the beam scanning on the target spectrum based on a scanning cycle.

5. The information transmission method according to claim 1, wherein the information transmission method further comprises:
    receiving resource indication information sent by the second network node, where the resource indication information is used to indicate a resource on the target spectrum scheduled by the second network node.

6. The information transmission method according to claim 1, wherein the information transmission method further comprises:
    sending indication information indicating a channel number to which the target spectrum belongs to the second network node.

7. A storage medium storing executable programs, wherein when the executable programs are executed by a processor, the steps of the information transmission method according to claim 1 are implemented.

8. An information transmission method, performed by a second network node, the information transmission method comprising:
    receiving occupancy information of a target spectrum sent by a first network node, where the occupancy information is determined by means of beam scanning of the first network node on the target spectrum; and performing resource scheduling on the target spectrum based on the occupancy information;

wherein the occupancy information is determined by the first network node performing the beam scanning on a target communication region between the first network node and the second network node on the target spectrum; and the performing resource scheduling on the target spectrum based on the occupancy information comprises:

performing the resource scheduling on the target spectrum in the target communication region based on the occupancy information;

wherein the target communication region is determined based on at least one of the following:

an angle of arrival of a reference signal transmitted by the second network node;

a historical communication beam of the first network node and the second network node; and a beam of an existing communication link between the first network node and the second network node.

9. The information transmission method according to claim 8, wherein the occupancy information comprises:

information of an occupancy state of the target spectrum scanned by at least one beam;

and/or, a number of beams scanning that the target spectrum is occupied.

10. The information transmission method according to claim 8, wherein the information transmission method further comprises:

sending resource indication information to the first network node, where the resource indication information is used to indicate a resource on the target spectrum scheduled by the second network node.

11. The information transmission method according to claim 8, wherein the information transmission method further comprises:

receiving indication information sent by the first network node; and determining, based on the indication information, a channel number to which the target spectrum belongs.

12. A communication device, comprising a processor, a transceiver, a memory, and executable programs stored in the memory that may be executed by the processor, wherein when executing the executable programs, the processor performs the steps of the information transmission method according to claim 8.

13. A storage medium storing executable programs, wherein when the executable programs are executed by a processor, the steps of the information transmission method according to claim 8 are implemented.

14. A communication device, comprising a processor, a transceiver, a memory, and executable programs stored in the memory that may be executed by the processor, wherein the executable programs when executed by the processor cause the processor to:

perform beam scanning on a target spectrum; and feed back occupancy information of the target spectrum determined based on the beam scanning to a second network node, where the occupancy information is used for the second network node to determine resource scheduling on the target spectrum;

wherein the perform beam scanning on a target spectrum comprises:

perform the beam scanning on a target communication region between the first network node and the second network node on the target spectrum; and the feed back occupancy information of the target spectrum determined based on the beam scanning to a second network node comprises:

feed back occupancy information of the target spectrum in the target communication region to the second network node, wherein the occupancy information is used for the second network node to determine resource scheduling on the target spectrum in the target communication region;

wherein the executable programs when executed by the processor further cause the processor to perform at least one of the following:

determine the target communication region between the first network node and the second network node based on an angle of arrival of a reference signal transmitted by the second network node;

determine the target communication region between the first network node and the second network node based on a historical communication beam of the first network node and the second network node; and determine the target communication region between the first network node and the second network node based on a beam of an existing communication link between the first network node and the second network node.

15. The communication device according to claim 14, wherein the occupancy information comprises:

information of an occupancy state of the target spectrum scanned by at least one beam; and/or, the number of beams scanning that the target spectrum is occupied.

16. The communication device according to claim 14, wherein the processor executable instruction when executed by the processor cause the processor to:

feed back the occupancy information to the second network node in response to at least one beam scanning to determine that the target spectrum is occupied.

* * * * *